United States Patent Office 3,079,107
Patented Feb. 26, 1963

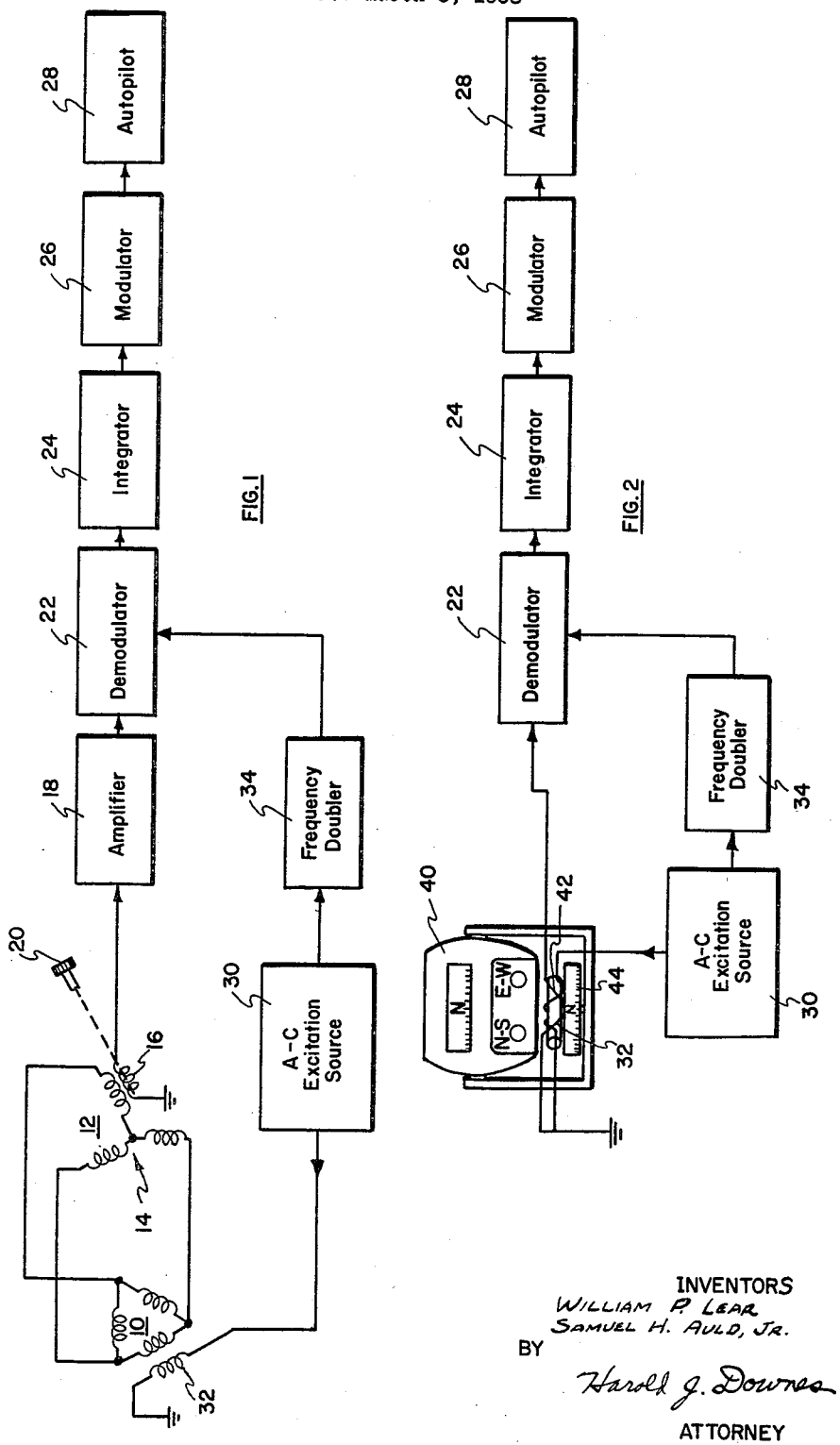

3,079,107
SYSTEM FOR CONTROLLING AN AIRCRAFT FROM A MAGNETIC SENSOR
Samuel H. Auld, Jr., Canoga Park, and William P. Lear, Pacific Palisades, Calif., assignors, by mesne assignments, to Motorola, Inc., Chicago, Ill., a corporation of Illinois
Filed Mar. 3, 1958, Ser. No. 718,838
7 Claims. (Cl. 244—77)

This invention relates to aircraft flight control systems, and more particularly to an improved system and means for controlling the aircraft from a magnetic sensing device.

In controlling the heading of an aircraft, for example, it is usual to utilize a directional gyroscope to develop signals from which to operate the necessary control surfaces. As is well known, the directional gyroscope is itself subject to precession, and this in turn causes the aircraft to undergo a change in heading. The directional gyroscope is an expensive unit, and means required to correct the heading errors or to compensate for the unwanted precession merely add to the expense.

It is an object of this invention to provide an improved heading control system for aircraft in which no directional gyroscope is required.

Another object of this invention is to provide improved means for controlling flight of an aircraft, which utilizes a magnetic sensor and a novel electronic system to develop signals for control purposes.

A further object of this invention is to provide a heading control system for aircraft wherein a flux valve or other magnetic sensing device is utilized to change or control the heading of the aircraft, thereby eliminating directional gyroscopes to this purpose.

It is a further object of this invention to provide a system for aircraft which utilizes a magnetic compass or other magnetic sensing device to control the heading of the aircraft, which employs a minimum number of component parts of simple design, and in which heading error of the type due to unwanted precession of a directional gyroscope cannot exist.

The above and other objects and advantages of this invention will become apparent from the following description, taken in conjunction with the accompanying drawing which illustrates examples thereof.

In the drawing,

FIG. 1 is a block diagram of a system employing a conventional flux valve for heading control of an aircraft, in accordance with this invention, and FIG. 2 is a block diagram, similar to FIG. 1, illustrating the use of a magnetic compass for heading control, also in accordance with this invention.

Referring to FIG. 1, wherein the windings of a flux valve 10 are connected to the stator windings 12 of a synchro device 14, the rotor winding 16 of which is connected to the input of an amplifier 18. A control knob 20 is provided for manually operating the shaft on which the rotor winding 16 is mounted. A demodulator 22 is connected to amplifier 18 and has its output coupled through an integrator 24 to a modulator 26. The output of modulator 26 is applied to an autopilot 28. The D.-C. signal existing at the output of the integrator could, of course, be used directly to operate the autopilot provided D.-C. signals are acceptable to said autopilot.

Excitation for flux valve 10 is provided from an A.-C. excitation source 30 through a coil 32. Since the output of the flux valve will be double the excitation frequency, as is conventional, any signal appearing in the output of amplifier 18 will also be double the excitation frequency. Accordingly, it is desirable that the switching frequency for the demodulator be the same as the frequency of the signals in the output of amplifier 18, and for this purpose a frequency doubler 34 is connected between excitation source 30 and demodulator 22.

As is well-known, flux valve 10 provides an output signal representing a magnetic vector relative to the earth's magnetic field. Accordingly, a voltage is induced in rotor winding 16 which corresponds to the position thereof relative to such magnetic vector. Control knob 20 preferably is calibrated so that the position thereof presents a visual indication to the pilot of a selected heading. Demodulator 22, being switched at the frequency of the output of amplifier 18, causes a pulsating D.-C. voltage to be applied to integrator 24. Integrator 24, which may be a conventional resistor-capacitor network, has a time constant sufficiently long to permit only signals having more than a predetermined duration to appear in its output. Modulator 26 converts the signals appearing in the output of integrator 24 to an A.-C. wave-form, and such output signal is applied to autopilot 28. Autopilot 28 functions in a conventional manner to operate control surfaces, e.g., a rudder, to change the heading of the aircraft. This heading change continues until the voltage induced in rotor winding 16 disappears. At this point, the aircraft is flying on the selected heading indicated by the position of control knob 20.

As previously mentioned, integrator 24 permits only signals representing the first time integral of persistent or long-term signals which appear in the output of demodulator 22. It will be recognized that even though the aircraft is flying along a desired heading, the flux valve may cause short-term error signals to be developed across rotor winding 16, as when the flux valve is undamped any tilt error in its winding would be reflected in an output signal, or when the aircraft is perturbating about the desired heading due to buffeting by winds. It is obviously undersirable to have the autopilot operate a control surface in response to transients of this sort, and accordingly the integrator 24 is provided with a sufficiently long time constant to make the system substantially insensitive to such false error indications. Such time constant may be of the order of three seconds or more.

Demodulator 22, in effect, serves a dual function. In addition to providing a D.-C. output, as previously explained, it is also effective as a quadrature stripper, i.e., it eliminates components of signals applied thereto which are 90 degrees out-of-phase with the desired signal. As is well known, an undesired quadrature component may exist which is of the same or a greater order of magnitude than the desired signal, in which case it becomes extremely important to minimize the effects of such component to enable the aircraft to follow the heading control signal. It will be seen that any quadrature component which is present would have equal positive and negative portions at the output of demodulator 22. Since the output cannot be both positive and negative at the same instant, quadrature components are substantially stripped from the signal appearing in the output of the demodulator.

For a further understanding of the operation of quadrature stripping networks of the type here referred to, reference may be had to the co-pending application of Gunnar Wennerberg, "Quadrature Stripping Network," Serial No. 618,368, filed October 25, 1956, and assigned to the same assignee as the present application.

It will be recognized that a flux valve is a source of relatively weak signals and, accordingly, a means such as amplifier 18 is required to provide sufficient amplification to raise the signals to a suitable level before they can be utilized. FIG. 2 illustrates the system of this invention employing a local magnetic field which is relatively strong compared to the earth's magnetic field upon which the flux valve operation depends. This source is the field provided by the ordinary magnetic compass in the aircraft. To utilize the field of the compass indicated at 40, a coil 42 is located adjacent the compass so as to be in the field of its magnets. Coil 42 is connected between a point of reference or ground potential and demodulator 22, and a control knob 44 is provided for turning coil 42 manually. Coil 42 is energized from excitation source 30 through coil 32 in the manner that flux valve 10 of FIG. 1 is energized. Since compass 40, in effect, provides a replica of the earth's magnetic field, but wherein the lines of force are more heavily concentrated, it will readily be seen that signals induced in coil 42 can be applied directly to demodulator 22 without the necessity of the amplification required for a flux valve. The operation of the remainder of the system is identical to that of FIG. 1.

It is noted that filtering may be employed wherever desired in the system to assist in eliminating unwanted signals which may be generated by the flux valve or magnetic compass; for example, a filter may be placed in the input or the output of amplifier 18.

Although the system of this invention has been described utilizing a flux valve, or a magnetic compass, this invention is not limited thereto, but embraces other magnetic sensing devices which can be adapted to provide signals representing a magnet vector relative to the earth's magnetic field.

What is claimed is:

1. In an aircraft, a flux valve for developing signals representing the position of a magnetic vector relative to the earth's magnetic field, a synchro device having stator and rotor windings, said flux valve having windings electrically coupled to the stator windings, a shaft for supporting the rotor winding, means coupled to said shaft for selectively positioning said rotor winding in a position corresponding to a desired heading for the aircraft, said rotor winding having signals induced therein which represent the angular difference between said magnetic vector and the position thereof, demodulator means to develop a D.-C. signal in response to the signals induced in said rotor winding, a modulator, an integrator connected between said demodulator means and said modulator, said integrator being operable to provide output signals therefrom which represent the first time integral only of signals applied thereto which have greater than a predermined duration, said modulator developing an A.-C. signal in response to the output of said integrator, and autopilot means coupled to said modulator for altering the heading of the aircraft until the aircraft arrives at the desired heading and the signal induced in said rotor winding is zero.

2. A combination in accordance with claim 1, exciter means providing an alternating current wave to said flux valve, and including frequency doubling means coupling said demodulator means to said exciter means to effect switching of said demodulator means at the frequency of the signals developed by said flux valve.

3. In an aircraft having an autopilot operating in response to a control signal, a system for controlling the autopilot including in combination, a magnetic sensing device in fixed relation to the aircraft, said sensing device including means constituting a magnetic reference in the earth's magnetic field, a pick-up coil cooperatively associated with said sensing device and adapted to have signals induced therein representing its position relative to the magnetic reference, means for selectively positioning said coil in a position corresponding to a desired heading, demodulator means coupled to said pick-up coil, integrator means coupled to said demodulator means and producing a control signal and means for applying said control signal at the output of said integrator means to the autopilot to control the heading of the aircraft so that the voltage induced in said pick-up coil is substantially zero.

4. The system of claim 3 in which said magnetic sensing device is a flux valve, and which system includes a synchro device having stator windings electrically connected to said flux valve and a rotor which forms the pick-up coil, and wherein said integrator means has a time constant sufficiently long to eliminate transients to thereby stabilize the control signal applied to the autopilot.

5. The system of claim 3 wherein said magnetic sensing device is a magnetic compass having a magnetic field, and said pick-up coil is located in said magnetic field, with said pick-up coil being energized to produce a signal representing the position of said coil in said magnetic field.

6. In an aircraft having an autopilot operating in response to an alternating current control signal, a system for controlling the autopilot including in combination, a magnetic sensing device in fixed relation to the aircraft, said sensing device including means constituting a magnetic reference in the earth's magnetic field, a pick-up coil cooperatively associated with said sensing device and adapted to have signals induced therein representing its position relative to the magnetic reference, manual means for selectively positioning said coil in a position corresponding to a desired heading, demodulator means coupled to said pick-up coil, modulator means for producing an alternating current control signal, integrator means coupling said modulator means to said demodulator means, and means for applying said control signal to the autopilot to control the heading of the aircraft so that the voltage induced in said pick-up coil is reduced to zero.

7. The system of claim 6 wherein said demodulator means removes quadrature components of the signal applied thereto, and said integrator means has a time constant sufficiently long to render the system insensitive to transient movements of the aircraft.

References Cited in the file of this patent

UNITED STATES PATENTS

| 2,539,411 | Esval et al. | Jan. 30, 1951 |
| 2,847,633 | Finkel et al. | Aug. 12, 1958 |
| 2,896,883 | Andeen | July 28, 1959 |

FOREIGN PATENTS

| 666,272 | Great Britain | Feb. 6, 1952 |